March 30, 1926.
A. B. MELLIN
END GATE LATCH
Filed Nov. 17, 1925
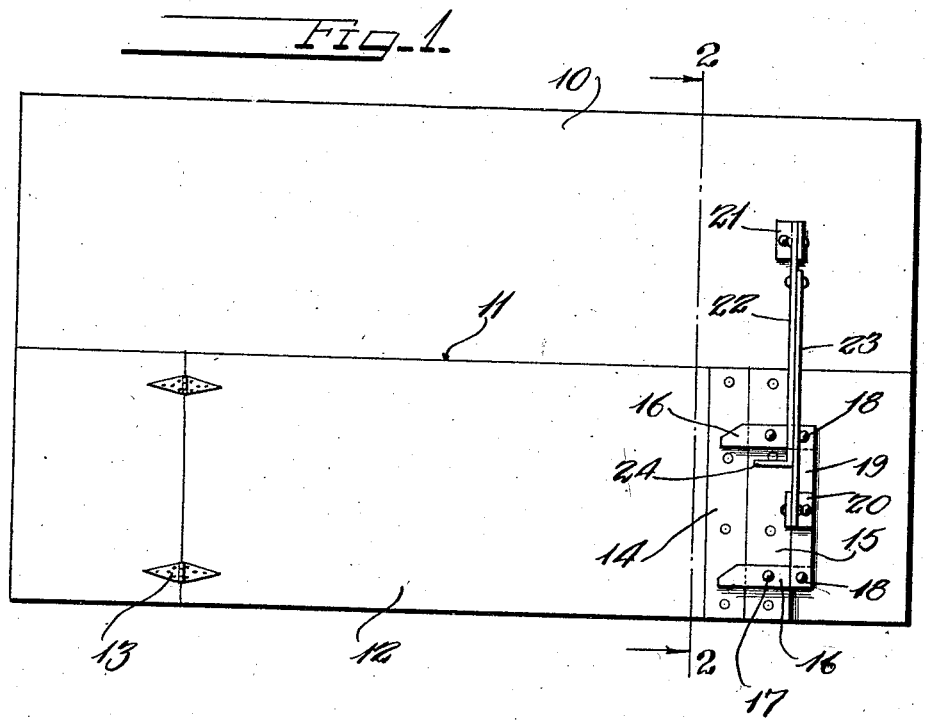
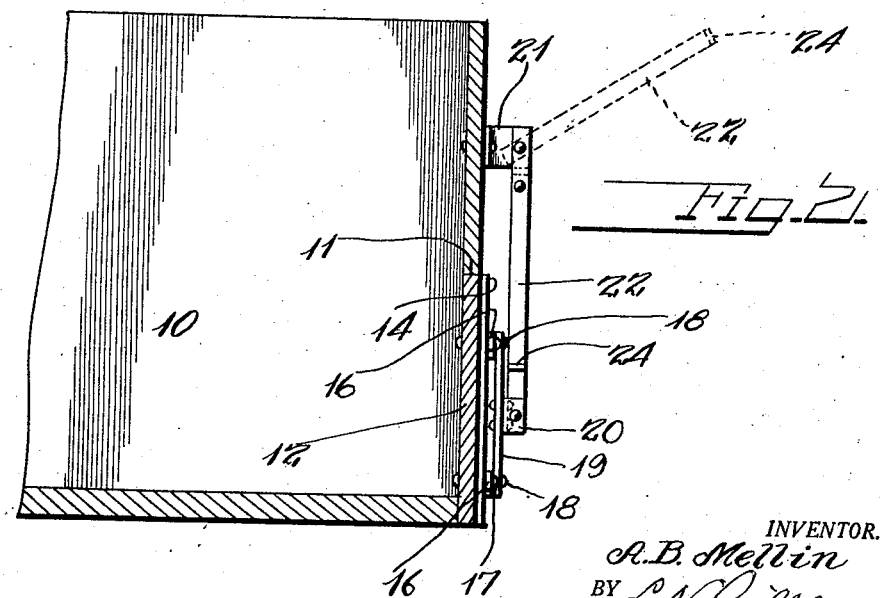
INVENTOR.
A. B. Mellin
BY
ATTORNEY

UNITED STATES PATENT OFFICE.

ABE BARRETT MELLIN, OF TURTLE LAKE, NORTH DAKOTA.

END-GATE LATCH.

Application filed November 17, 1925. Serial No. 69,671.

*To all whom it may concern:*

Be it known that I, ABE BARRETT MELLIN, a citizen of the United States, residing at Turtle Lake, in the county of McLean and State of North Dakota, have invented certain new and useful Improvements in End-Gate Latches, of which the following is a specification.

This invention relates to end gate fasteners for vehicle bodies.

One object of the invention is to improve the general construction of devices of this kind.

A second object of the invention is to provide an improved latch arrangement for such devices.

A third object of the invention is to provide an improved latch operating mechanism for such devices.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a rear view of a wagon body provided with an end gate equipped with this invention.

Figure 2 is a section on the line 2—2 of Figure 1.

In the drawings there is shown a vehicle body 10 having a gate opening 11 at the lower rear end thereof. This gate opening is closed by a gate 12 which is secured at one side of the opening 11 by hinges 13. The free edge of this gate is covered by a bar 14 and on the lower part of the body opposite this bar is a similar bar 15 whereon is pivoted a pair of pawls 16, these pawls being mounted on pivots 17. Normally one end of each pawl projects across the bar 14 and the remaining ends are connected by pivots 18 to a link 19 whereon is carried a pivoted angle member 20. On the rear portion of the body is pivoted a second angle member 21 to which is pivotally connected an operating lever 22. A link 23 connects this operating lever with the angle plate 20.

Under these circumstances when the handle portion 24 of the operating lever 22 is raised the link 19 will be drawn upward so as to shift the members 16 and release the closed edge of the gate. The gate can then swing open. However, when the gate is closed and the lever 22 depressed such gate is accordingly locked.

There has thus been provided a simple and efficient device of the kind described and for the purpose specified.

Having thus described the invention, what is claimed as new, is:

A latch device for the end gate of a vehicle having an end gate opening and provided with an end gate hinged at one side of said opening, said latch device comprising a plurality of pivoted members overlapping the edge of the gate, a link connecting said members, an angle bracket pivoted to said link, a second angle bracket pivoted to the body above said link, an operating lever pivoted to said second angle bracket at right angles to the pivot thereof, and a second link pivoted to the first angle bracket and the operating lever.

In testimony whereof I affix my signature.

ABE BARRETT MELLIN.